Patented June 5, 1945

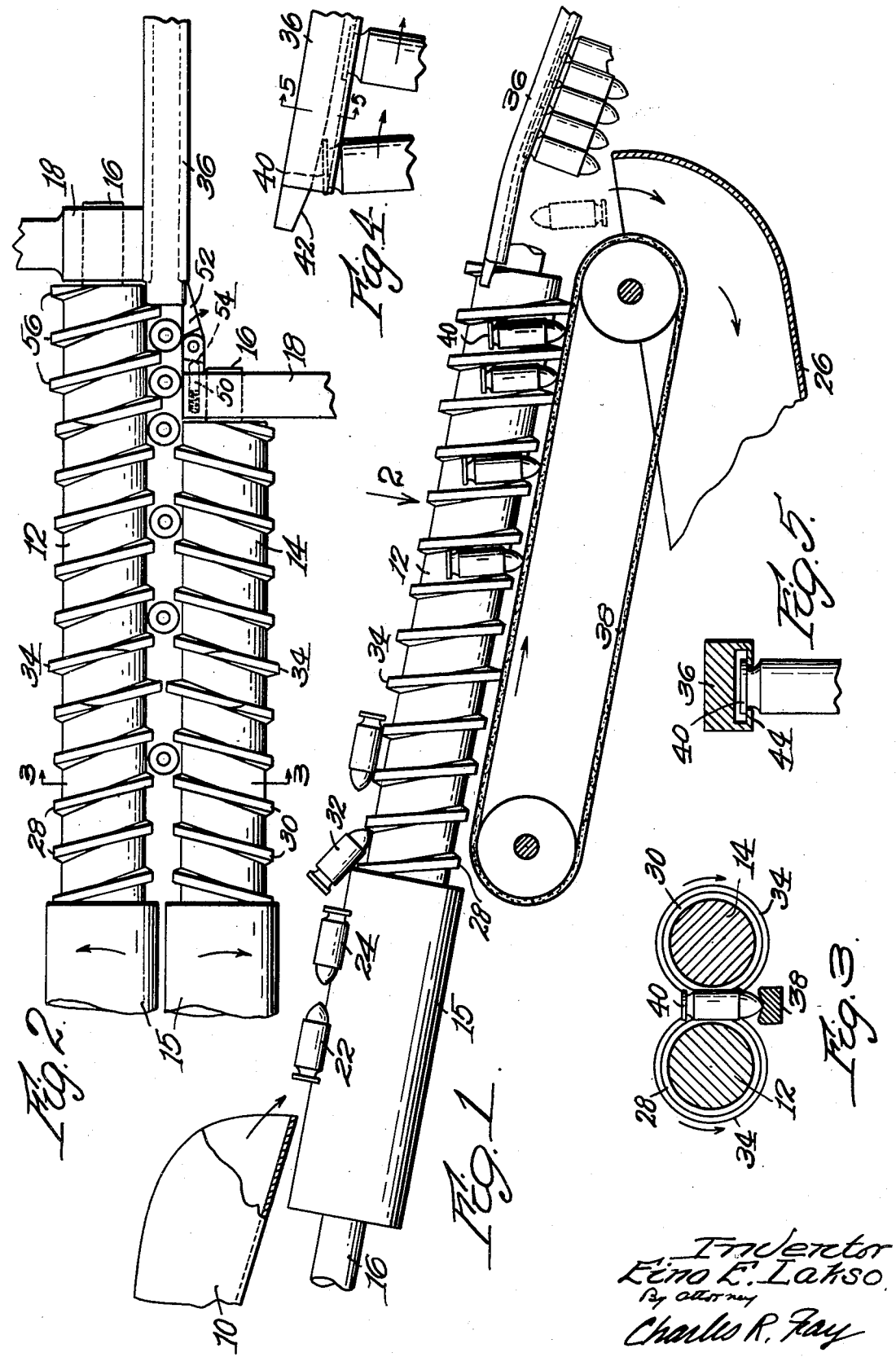

2,377,431

UNITED STATES PATENT OFFICE 2,377,431

ARTICLE HANDLING MACHINE

Eino E. Lakso, Fitchburg, Mass.

Application August 24, 1942, Serial No. 455,881

5 Claims. (Cl. 198—33)

This invention relates to apparatus and method for aligning, feeding, and delivering articles which are originally in misaligned or helter skelter condition.

The principal objects of the invention include the provision of a method for aligning misaligned articles having portions thereof heavier than other portions and taking advantage of this fact to effectuate the method, and providing an apparatus for carrying out the method; the provision of method and apparatus for aligning and delivering heavy-ended articles by causing the articles to drop heavy end down onto a support while traveling the articles to the delivery end of the apparatus; and the provision of method and apparatus for aligning, feeding, and delivering heavy-ended articles from a hopper by successively causing the articles to fall heavy end down on a support, feeding the articles one after another to the delivery end of the apparatus, and causing any articles which have failed to fall heavy end down to drop out of the apparatus to be returned to the hopper.

Further objects of the invention include the provision of a pair of inclined parallel screw-threaded rollers adapted to be rotated oppositely and having certain threads larger than others to act as a stop or barrier for any articles which may be riding down the rollers on the threads, so that whether the articles are traveling with their heavy ends forward or to the rear, the articles will be stopped, and as the threads rotate, the articles naturally drop between threads with the heavy ends down, and thenceforth are traveled in parallel relation to other similar articles already correctly positioned between the threads; and the provision of a guide chute for taking the articles from the rollers at the lower ends thereof for close and successive progress to the delivery end of the chute.

Other objects and advantages of the invention will appear hereinafter.

Reference is to be had to the accompanying drawing, in which

Fig. 1 is a view in side elevation of an apparatus embodying my invention, one roller being removed for clarity of illustration;

Fig. 2 is a plan view looking in the direction of arrow 2 in Fig. 1, and showing both rollers;

Fig. 3 is a section on line 3—3 of Fig. 2;

Fig. 4 is an enlarged view of the front end of the delivery chute; and

Fig. 5 is a section on line 5—5 of Fig. 4.

This invention is illustrated as an apparatus for aligning, feeding, and delivering .45 caliber ammunition, but I do not limit the invention to this application, as other articles may be operated upon in similar manner. A chute or apron 10 is provided for initial reception of the shells in their helter skelter or misaligned condition, and the shells may be placed on the chute by hand or by hoppers or other means. Chute 10 is shown as inclined so that the shells will fall by gravity onto rollers 12, 14 which are closely spaced and parallel and are arranged to be rotated on their end journals 16 in any convenient bearing support such as illustrated at 18. Any desired means may be employed to rotate the rollers, it being preferred to gear them together, but this forms no part of the invention and has been omitted from the drawing. In any case, rollers 12, 14 are arranged to rotate oppositely with their adjacent surfaces traveling upwardly, and the rollers are inclined to lead downwardly from chute 10 to terminate in the vicinity of a delivery chute.

Rollers 12, 14 are of similar diameter and at their upper ends they are plain, as at 15, so that all shells dropping from chute 10 will fall on the plain roller surfaces. The rollers at their plain areas are so close as to prevent the shells from falling therebetween, and the described rotation of the rollers causes the shells to fall into an axially aligned relation, whether the heavy bullet ends or the lighter cap ends are foremost, see shells 22, 24 in Fig. 1. However, some shells may not become so aligned due to a too rapid delivery from the chute, but it is contemplated that the rate of delivery from chute 10 will be controlled so that substantially all shells will fall onto the roller plain ends either in the position of shell 22 or in the position of shell 24. In case shells fall off the rollers, they will be received in a return chute or pan 26 which extends under the rollers.

Rollers 12, 14 are screw-threaded from the plain ends 15, and the threads are deep enough to allow reception of the particular articles being operated upon to be received therebetween. It will be noted that as shown the threads, indicated at 28, 30, have a crest diameter slightly less than the diameter of the plain ends 15, but they still are capable of preventing contact of the articles between the rollers; that is, the threads cooperate to extend oppositely into the path of the articles and maintain them separate. Threads 28, 30 may be single or multiple and the lead may vary depending on the required speed of travel of the articles, without departing from the invention, conventional threading being here shown for clarity of illustration.

As the aligned shells travel down the plain ends 15 of the rollers, they will tilt about the lower edge of the plain surfaces, if the heavy end is forward, see shell 32 in Fig. 1, thus correctly dropping down between two runs of the threads. If the light or cap end is forward, the shell will ride out on a pair of opposed threads until the heavy end is free of the plain roller ends, whereupon the shell is overbalanced and falls down between threads with the heavy end down. Hence, all the shells will correctly fall with their heavy or bullet ends down and therefore the articles are aligned with like ends pointing in the same direction.

In some instances, the pitch of the threads may be equal to or less than the length of the articles, in which case a few articles may bridge and be carried on two pairs of opposed threads, and therefore not become overbalanced by their heavy ends. To overcome this, I provide a turn or turns of the thread at 34 having a crest diameter greater than that of the threads 28, 30; for instance, about the diameter of the plain ends 15. This turn, or turns, acts as a stop or barrier and causes the shells abutting the same to be stopped for an instant, so that as the threads progress, a blank space between threads is presented to the heavy end of the article, and consequently it will overbalance and drop correctly as desired, and therefore it will be seen that substantially every shell will be correctly positioned between two pairs of opposed threads to be fed down the rollers to a delivery chute 36, with their cap ends up.

A support is provided for the shells to rest on so that they will not fall through the rollers, and this support may take the form of a driven belt 38 which may be geared to travel at a speed corresponding to the rate of progress of the articles. With a fixed support, the articles merely slide down; with the belt 38 as shown, there is no sliding contact but only a fixed supporting contact of the belt relative to the lower ends of the articles. In any case, the support is terminated at the ends of the rollers, or at the receiving end of the delivery chute 36, for a purpose to be described.

All the articles traveling down the rollers will of course fall off the lower ends thereof unless some delivery means is provided, and this means may take many forms. However, in the present case, advantage is taken of the fact that the shells are provided with extractor grooves and flanges at the cap or light ends of the shells, the flanges being indicated at 40. These flanges are naturally at the tops of the shells as they progress down the rollers, and the delivery chute 36 has an inverted U-shape to receive the upper ends of the shells. A baffle 42 guides any shell higher than the others into the delivery chute, and a pair of opposed guide rails 44 extend inwardly toward each other at the ends of the legs of the U-shaped chute to receive the extractor grooves, the flanges 40 resting on the rails as shown in Figs. 4 and 5. There is no motive power applied to the shells in the delivery chute except insofar as each shell impinges on and drives the next preceding shell forwardly, so that a tightly packed reservoir of shells is always present in the delivery chute, and any loading or packaging device at the end of the chute, is assured of always having a continuous line of shells to operate on, there being no gaps between shells in the delivery chute.

The delivery chute 36 has another important function which is that it will receive and catch only shells having heavy or bullet ends down. If a shell should travel down the rollers with cap end down, the rails naturally cannot catch it, and it will fall down off the support 38 into the return chute 26. Thus the delivery chute not only delivers the shells in successive contacting relation, but will cause ejection of all shells not in proper alignment, and hence the delivery chute must receive and hold only shells having cap ends up and bullet ends down, no failure of this effect being possible.

In the event of a jam of the articles, as by a surplus of articles happening to occur on the rollers at their lower end, means is provided for dumping the surplus articles into return chute 26. Roller 14 is made shorter than roller 12, and a spring-pressed plunger 50 is provided in a bearing support 18 so that the plunger is urged to the right in Fig. 2.

A gate 52 is pivoted to swing on a vertical axis and this gate has a square end 54 impinged upon by the plunger, the latter tending to maintain the gate as shown. However, a jam of articles in the vicinity of the gate will force it open to allow escape of the articles causing the jam, and once the jam is cleared, the plunger will return the gate to its normal position. Several turns of thread 28 are enlarged as at 56 to ensure continued traveling of the correctly positioned articles, the enlarged threads being located just opposite the gate and bearing support, the latter being of course plain on their interior surfaces and affording no article traveling means.

From the above disclosure the operation of the apparatus will be clear, and no further description is thought to be necessary. However, it is to be noted that among other things I have provided a method and means for aligning heavy ended articles in helter skelter relation, by taking advantage of their heavy ends; I have provided ejecting means for any articles wrong end up; and I have provided a delivery chute which not only delivers the articles in close relation but also aids in ejecting all wrongly aligned articles. Also, by taking advantage of the physical attributes of shells, I have provided a delivery chute which accepts only shells which are cap end up and releases shells which have their bullet ends up, so that all shells will be delivered thereby in a desired alignment.

Having thus described my invention and the advantages thereof, I do not wish to be limited to the details herein disclosed, otherwise than as set forth in the claims, but what I claim is:

1. An apparatus for aligning helter skelter articles comprising a pair of rotating rollers located in side by side parallel relation, screw-threads on the rollers, said threads cooperating to form traveling pockets between the rollers, a part of a thread on one roller having a crest diameter greater than that of the remainder of the threads to act as a barrier for momentarily stopping articles traveling on the threads, whereby said articles may not travel the length of the rollers on the threads, but must fall between the rollers, into the pockets.

2. An apparatus for aligning helter skelter articles comprising a loading chute, a pair of parallel screw threaded rollers extending from said chute, said screw threads being narrower than the articles and defining pockets between the rollers, a support below the pockets, and a chute at the ends of the rollers, said chute having means for supporting articles fed along the rollers in the pockets, and an intermediate part of each thread being higher than the rest.

3. An apparatus for aligning and feeding shells comprising a pair of rollers disposed in side by side parallel relation, said rollers having plain cylindrical surfaces for initially receiving and axially aligning the shells, cooperating screw threads at other portions of the rollers forming pockets for reception of single shells, the screw threads being narrower than the shell diameter and effective to momentarily support the shells issuing from the cylindrical surfaces so that the bullet ends of the shells overbalance the latter and cause them to drop into successively aligned position into the pockets, said pockets maintaining the shells in this condition, and a support below the rollers for the shells.

4. An apparatus for aligning and feeding articles including a pair of parallel rollers of unequal length, means forming pockets between said rollers, said pockets traveling along the rollers, and a spring pressed gate, said gate normally lying in extension of the surface of the shorter roller adjacent the other roller and being effective to yield to emit articles jammed on the rollers at the gate.

5. Apparatus as recited in claim 1 wherein the thread on the other roller has a part thereof with a crest diameter greater than the remainder for the same purpose.

EINO E. LAKSO.